(12) United States Patent
Viator et al.

(10) Patent No.: US 11,814,939 B2
(45) Date of Patent: Nov. 14, 2023

(54) SYSTEM AND METHOD FOR VALVE GREASING IN A WELL TREE

(71) Applicant: Cameron International Corporation, Houston, TX (US)

(72) Inventors: Mark Viator, Houston, TX (US); Yang Chen, Houston, TX (US); Payal Desai, Houston, TX (US); Aleem Aman Khokhar, Houston, TX (US); Nivedita Sharma, Noida (IN); Jeffery Traylor, Odessa, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/755,071

(22) PCT Filed: Oct. 23, 2020

(86) PCT No.: PCT/US2020/057082
§ 371 (c)(1),
(2) Date: Apr. 20, 2022

(87) PCT Pub. No.: WO2021/081339
PCT Pub. Date: Apr. 29, 2021

(65) Prior Publication Data
US 2022/0290547 A1     Sep. 15, 2022

Related U.S. Application Data

(60) Provisional application No. 62/926,171, filed on Oct. 25, 2019.

(51) Int. Cl.
*E21B 34/02*     (2006.01)
*F16N 11/00*     (2006.01)
(Continued)

(52) U.S. Cl.
CPC .......... *E21B 43/2607* (2020.05); *E21B 34/02* (2013.01); *F16N 11/00* (2013.01);
(Continued)

(58) Field of Classification Search
None
See application file for complete search history.

(56) References Cited

U.S. PATENT DOCUMENTS

| 7,353,835 B2 | 4/2008 | Elliott |
| 8,544,609 B2 | 10/2013 | Elliott |

(Continued)

FOREIGN PATENT DOCUMENTS

| EP | 0984133 A1 | 3/2000 |
| WO | 9003490 A1 | 4/1990 |
| WO | 2014182709 A1 | 11/2014 |

OTHER PUBLICATIONS

International Search Report and Written Opinion issued in PCT Application PCT/US2020/057082, dated Feb. 2, 2021 (10 pages).

*Primary Examiner* — Matthew Troutman
*Assistant Examiner* — Douglas S Wood
(74) *Attorney, Agent, or Firm* — Matthew Goode

(57) ABSTRACT

A technique facilitates greasing of valves on a well tree, e.g. a frac tree, according to a simple process which enables selected, individual valves to be greased when desired. In some applications, the greasing process may be automated and controlled via a greasing control system. According to an embodiment, a greasing system is connected with grease ports at a plurality of actuatable valves located in a well tree. The greasing system has a plurality of grease valves which may be associated with each of the actuatable valves, e.g. with each of the grease ports. A pump is used to pump grease to the grease valves and the grease valves are selectively actuated to open positions to provide controlled greasing of desired actuatable valves so as to remove debris from and to lubricate selected actuatable valves.

19 Claims, 12 Drawing Sheets

(51) Int. Cl.
  *F16N 13/22* (2006.01)
  *E21B 43/26* (2006.01)

(52) U.S. Cl.
  CPC .......... *F16N 13/22* (2013.01); *F16N 2250/04* (2013.01); *F16N 2250/40* (2013.01); *F16N 2280/00* (2013.01)

(56) References Cited

U.S. PATENT DOCUMENTS

| | | |
|---|---|---|
| 9,052,061 B2 | 6/2015 | He et al. |
| 10,260,327 B2 | 4/2019 | Kajaria et al. |
| 10,358,891 B2 | 7/2019 | Knott |
| 10,577,888 B2 | 3/2020 | Knott |
| 10,619,471 B2 | 4/2020 | Kajaria et al. |
| 10,753,535 B2 | 8/2020 | McKim et al. |
| 10,760,735 B2 | 9/2020 | McKim et al. |
| 10,982,808 B2 * | 4/2021 | Zerkus ................ E21B 43/2607 |
| 11,137,109 B2 * | 10/2021 | Babineaux ............. F16N 11/08 |
| 2017/0146189 A1 | 5/2017 | Herman et al. |
| 2017/0336022 A1 * | 11/2017 | Gouge ................... F16N 25/00 |
| 2018/0328536 A1 | 11/2018 | Gouge |
| 2020/0332954 A1 * | 10/2020 | Babineaux ............. E21B 41/00 |
| 2020/0347990 A1 * | 11/2020 | McKim .................. F16N 25/00 |
| 2021/0324706 A1 * | 10/2021 | Beason .................. F16N 29/02 |
| 2022/0186583 A1 * | 6/2022 | Cain ....................... F16N 11/00 |
| 2023/0003305 A1 | 1/2023 | Gavela et al. |

\* cited by examiner

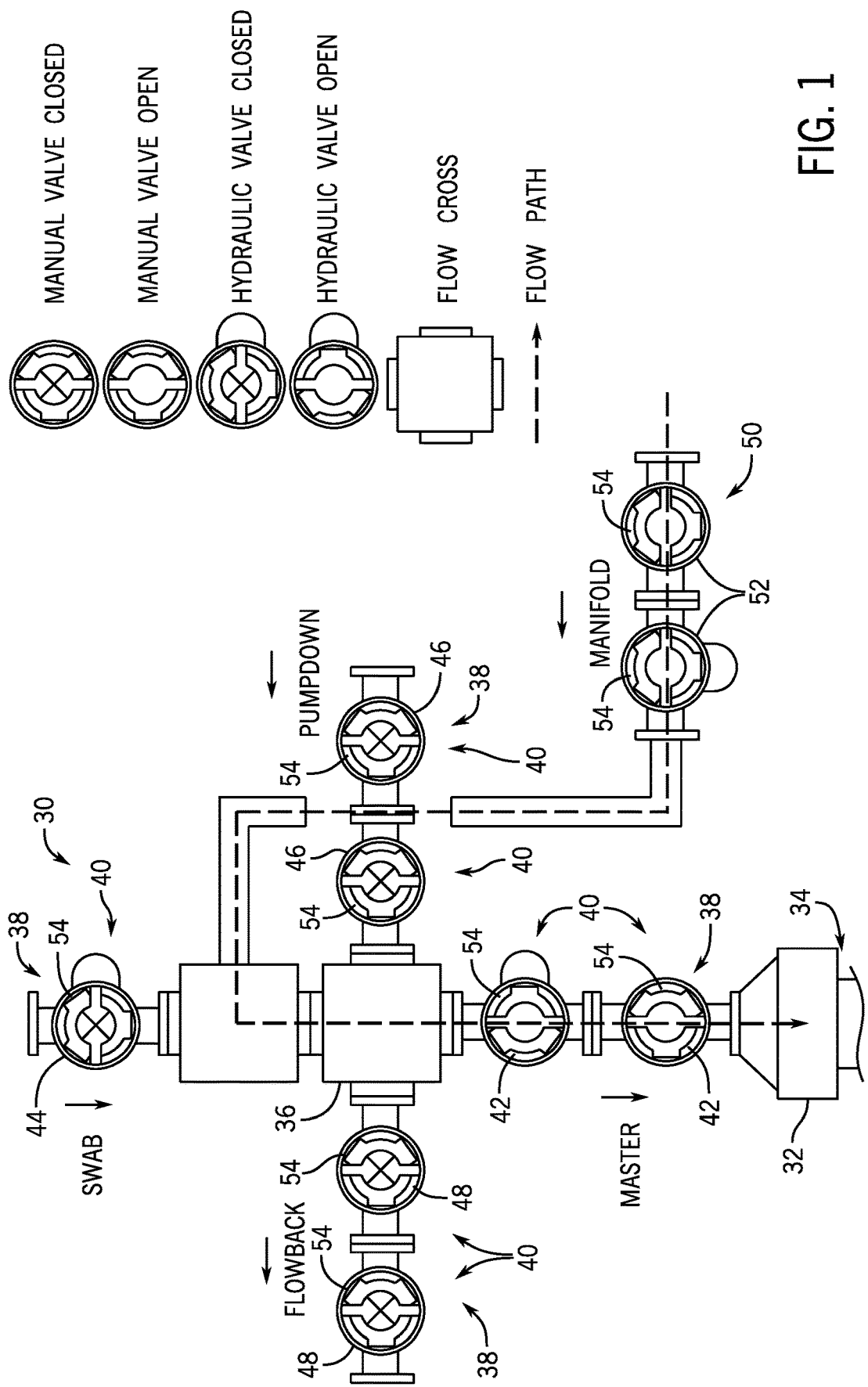

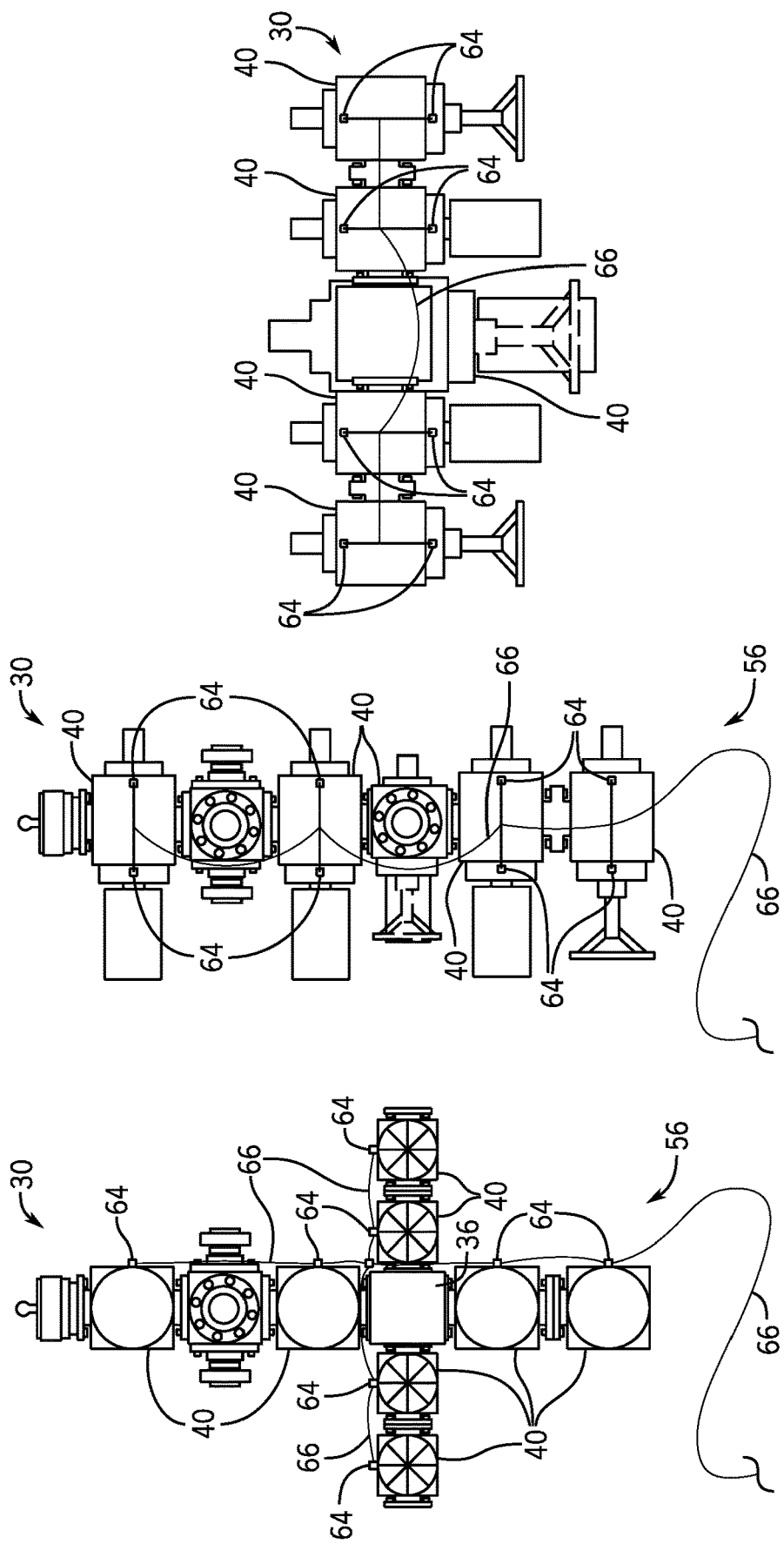

SYSTEM AND METHOD FOR VALVE GREASING IN A WELL TREE

CROSS-REFERENCE TO RELATED APPLICATION

The present document is based on and claims priority to U.S. Provisional Application Ser. No. 62/926,171, filed Oct. 25, 2019, which is incorporated herein by reference in its entirety.

BACKGROUND

Hydrocarbon fluids such as oil and natural gas are obtained from a subterranean geologic formation, referred to as a reservoir, by drilling a well. The well may contain at least one wellbore which extends down into a subterranean formation below a wellhead. A frac tree may be installed on the wellhead and serves as a flow control structure during stimulation jobs, e.g. fracturing jobs. The frac tree may comprise various actuatable valves which are used to control flow through the frac tree. During stimulation jobs, sand and other debris can enter and accumulate within internal cavities of the valves as pressurized fracturing fluid passes through the valves. The accumulation of sand and other debris within the valves can cause serious damage and potentially break the sealing integrity of the valves as they are actuated between open and closed positions. The sand and debris may be displaced by grease which is forced through the valve during maintenance activities. The grease also serves to lubricate moving parts inside the valve.

Conventional approaches to greasing may comprise manually connecting a grease hose to a fitting on the valve and then pumping grease through the valve. This approach tends to be a relatively time-consuming process. In other approaches, a relatively large number of grease hoses may be connected between a manifold and multiple valves. Grease is then pumped through the manifold and through the multiple valves. Due to the high pressure of the fracturing system, other activities at the same well may be stopped during the greasing activity and this causes interruptions to the overall stimulation operation. Additionally, the multiple grease hoses can cause tripping and tangling hazards.

SUMMARY

In general, a system and methodology are provided for facilitating greasing of valves on a well tree, e.g. a frac tree, according to a simple process which enables selected, individual valves to be greased when desired. In some applications, the greasing process may be automated and controlled via a greasing control system. According to an embodiment, a greasing system is connected with grease ports at a plurality of actuatable valves located in a well tree. The greasing system has a plurality of grease valves which may be associated with each of the actuatable valves, e.g. with each of the grease ports. A pump is used to pump grease to the grease valves and the grease valves are selectively actuated to open positions to provide controlled greasing of desired actuatable valves so as to remove debris from and to lubricate the actuatable valves.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 is a schematic illustration of an example of a well tree, e.g. a frac tree, installed on a wellhead positioned over a well and showing a flow path for hydraulic fracturing, according to an embodiment of the disclosure;

FIGS. 4-6 are front, side, and top views of a well tree coupled with a single grease line to connect a plurality of grease valves, according to an embodiment of the disclosure;

DETAILED DESCRIPTION

Figure 3:
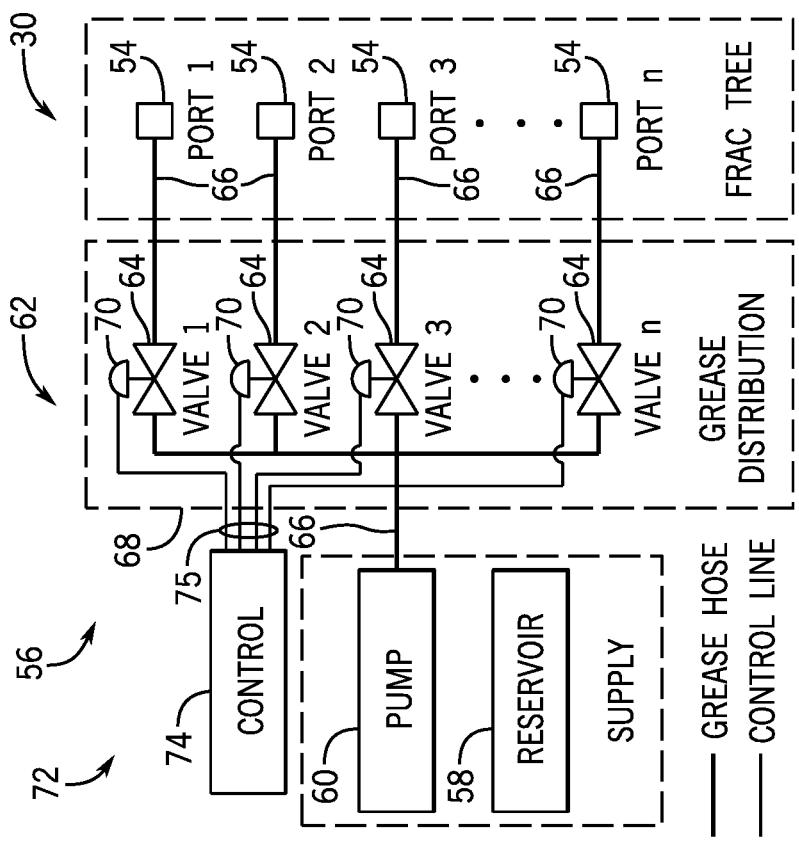
FIG. 3 is a schematic illustration of an example of a controllable manifold style greasing system coupled with a well tree, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate greasing of actuatable valves on a well tree, e.g. a frac tree. By way of example, the actuatable valves may comprise master valves, swab or crown valves, pump down valves, flow back valves, or other types of actuatable valves used to control flow through the well tree. The technique described herein facilitates greasing of the various actuatable valves according to a simple process which enables selected, individual valves to be greased when desired. In some applications, the greasing process may be automated and controlled via a greasing control system. Additionally, some embodiments employ an automated valve control for controlling actuation of the actuatable valves between closed and open flow positions.

According to an embodiment, a greasing system is connected with grease ports at a plurality of actuatable valves located in a well tree. Each actuatable valve may have a single grease port or a plurality of grease ports, e.g. two grease ports, located to facilitate flushing of debris from the actuatable valve and for lubricating the valve. The greasing system has a plurality of grease valves which may be associated with each of the actuatable valves, e.g. with each of the grease ports or with selected pairs or groups of grease ports. A pump is used to pump grease to the grease valves and then to the selected actuatable valves. The grease valves may be selectively actuated to open positions to allow grease flow therethrough and thus to provide controlled greasing of desired actuatable valves.

The greasing technique provides an efficient, cost-effective approach to greasing specific actuatable valves as needed without substantially interrupting the overall stimulation/fracturing operation. For example, different types of actuatable valves located at different sections of the well/frac tree have different operational conditions and thus benefit from different greasing frequencies. As an example, stimulation fluids with a high concentration of proppant flow through master valves and manifold valves at relatively high pressure so those types of valves benefit from more frequent greasing compared to actuatable valves in other sections of the tree. The greasing system also may help avoid or reduce human exposure to high-pressure zones at a wellsite during valve greasing while speeding up the valve greasing process with minimal interruption to the overall stimulation operation. The technique also enables execution of individual valve greasing on an as-needed basis. The greasing system further enables enforcement of a more optimized valve greasing regimen by, for example, preventing an operator from skipping greasing of certain valves.

Referring generally to FIG. 1, an example of a well tree 30 is illustrated as installed on a wellhead 32 and showing a flow path for hydraulic fracturing as described in greater detail hereinbelow. The well tree 30 may be used during a stimulation operation with respect to a well 34 located below the wellhead 32. In this example, the well tree 30 is a frac tree but the system and methodology described herein may be used on various types of well trees. In the illustrated example, the well tree 30 has a flow cross 36 and a plurality of valve sections 38 coupled in fluid communication with the flow cross 36. The plurality of valve sections 38 comprise actuatable valves 40. By way of example, the actuatable valves 40 may comprise master valves 42, swab or crown valves 44, pump down valves 46, flow back valves 48, and/or other suitable actuatable valves 40. The well tree 30 also may comprise or may be coupled with a manifold section 50 having actuatable manifold valves 52 which control fluid flow along flow paths to different wells.

By opening and closing various actuatable valves 40 on the well tree 30, different flow paths can be created for well stimulation operations such as wireline perforation and hydraulic fracturing. Depending on the application, the actuatable valves 40 may be manually actuated valves, hydraulically actuated valves, or otherwise actuatable valves. Some embodiments may use a mixture of manually operated valves and otherwise actuated valves. Additionally, each actuatable valve 40 may comprise at least one grease port 54 through which grease may be pumped to clear debris, e.g. sand, from internal valve cavities and to lubricate the actuatable valve 40.

Figure 2:
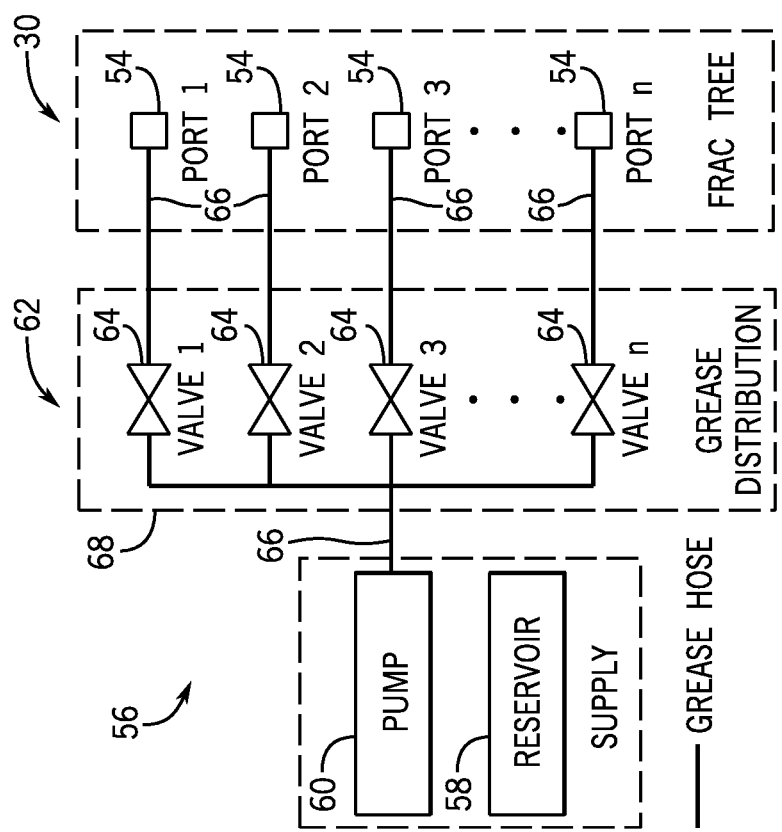
FIG. 2 is a schematic illustration of an example of a manual manifold style greasing system coupled with a well tree, according to an embodiment of the disclosure.

Referring generally to FIG. 2, a schematic illustration is provided of frac tree 30 having a plurality of grease ports 54 associated with corresponding actuatable valves 40, e.g. one or two grease ports 54 per actuatable valve 40. Grease is supplied to the grease ports 54 and thus to the corresponding actuatable valves 40 via a greasing system 56. In this example, the greasing system 56 is a manual manifold style greasing system and comprises a grease reservoir 58 and a grease pump 60 which is fed by grease from the grease reservoir 58. The greasing system 56 also comprises a grease distribution network 62 connected between the grease pump 60 and the grease ports 54.

The grease network 62 comprises a plurality of grease valves 64 positioned along grease flow lines 66. The grease valves 64 are actuatable to control the flow of grease to selected grease ports 54. For example, the grease valves 64 may be shifted between closed and open positions to enable the flow of grease through selected grease ports 54 and thus into selected actuatable valves 40. In some embodiments, the grease valves 64 may be positioned in a grease distribution manifold 68.

According to some embodiments, the grease valves 64 may be manually operated valves. In other embodiments, however, the grease valves 64 may be automatically actuatable as illustrated in the controllable manifold style grease system 56 illustrated in FIG. 3. For example, the grease valves 64 may each comprise a remotely controllable actuator 70 coupled with a greasing control system 72. By way of example, the greasing control system 72 may be a controllable manifold style control system and may comprise a processor-based control 74, e.g. a computer type control, which may be programmed or otherwise configured to control the greasing of specific actuatable valves 40, e.g. via control lines 75. In some embodiments, the processor-based control 74 may receive feedback from various sensors, e.g. pressure sensors, to facilitate automation of the greasing operation based on feedback related to the individual actuatable valves 40. The processor-based control 74 may be separated from the reservoir 58 and pump (or pumps) 60 while, for example, the reservoir 58 and pump (or pumps) 60 are positioned proximate the well tree 30 so that grease travels over a relatively short distance.

Referring generally to FIGS. 4-6, an embodiment of the well tree 30 and a portion of the greasing system 56 is illustrated. In this example, a single grease flow line 66 supplies grease to the grease network 62. The grease network 62 further comprises a plurality of branch flow lines 66 which deliver the grease to corresponding grease valves 64 and grease ports 54. In a variety of applications, each actuatable valve 40 may have a plurality of grease ports 54, e.g. two grease ports as illustrated, with the corresponding number of grease valves 64 mounted at the grease ports 54.

Figure 7:
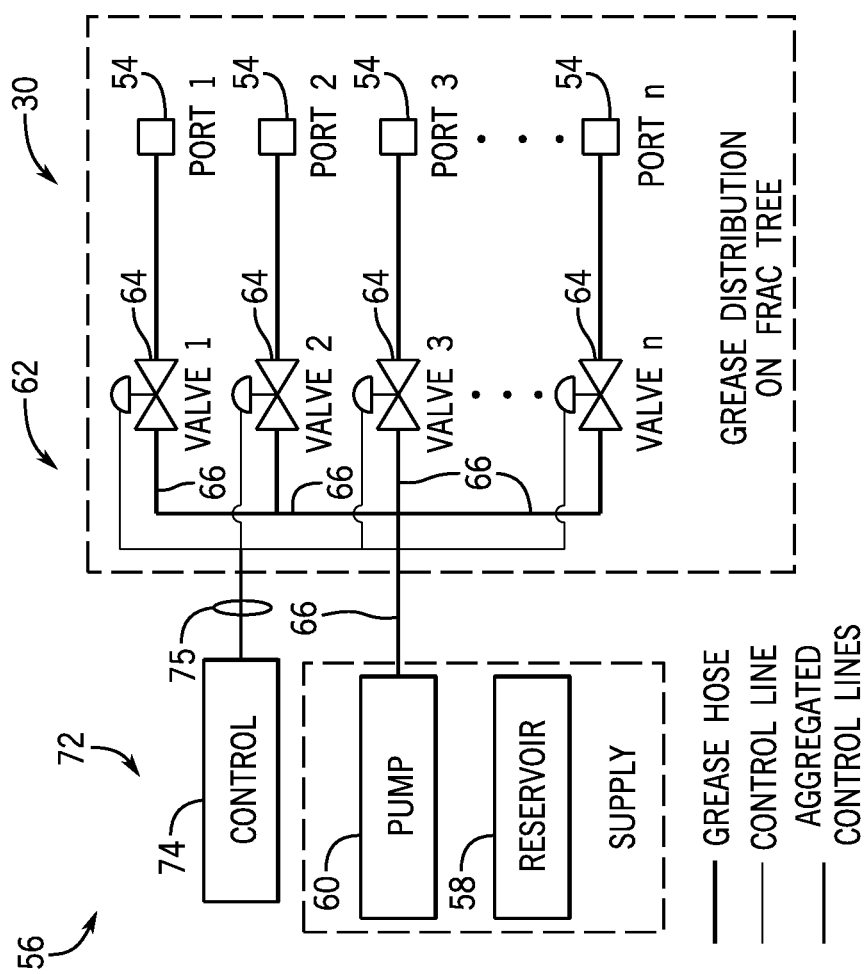
FIG. 7 is a schematic illustration of an example of instrumentation on a frac tree to run a single grease line to the tree for connecting a plurality of grease valves in a greasing system, according to an embodiment of the disclosure.
Figure 10:
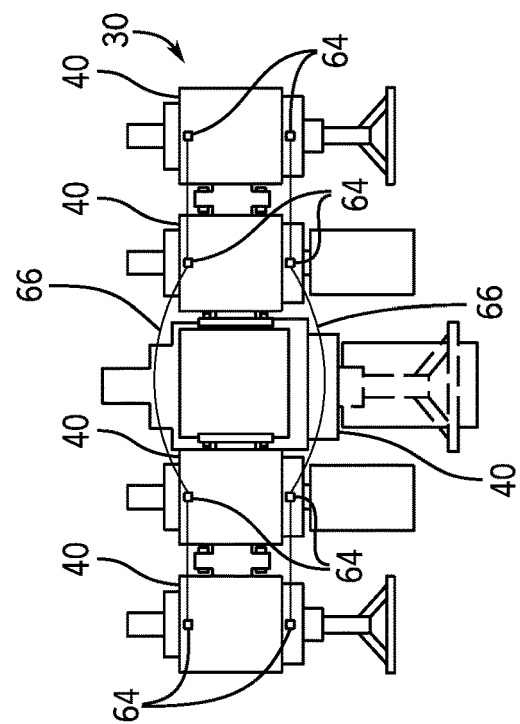
FIGS. 8-10 are front, side, and top views of a well tree coupled with dual grease lines to a plurality of grease valves, according to an embodiment of the disclosure.
Figure 9:
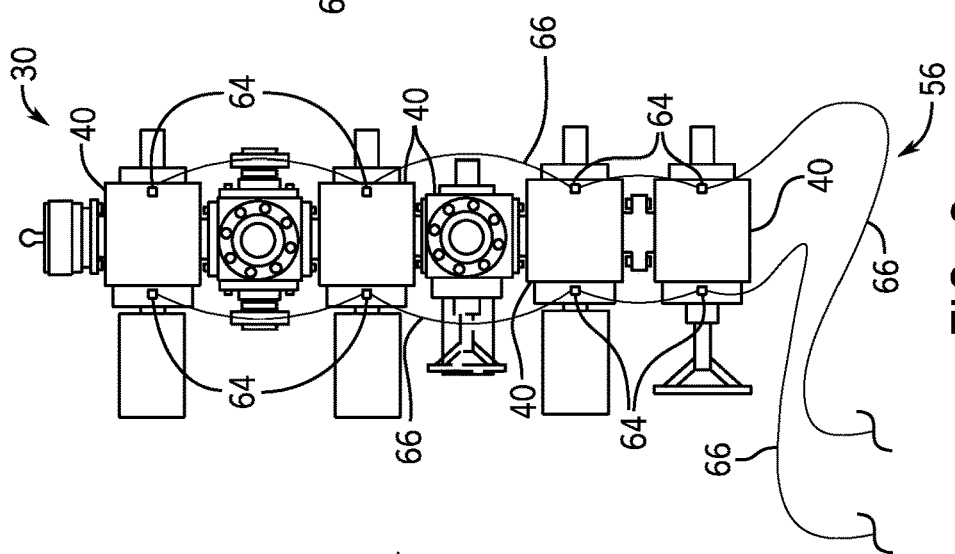
Figure 8:
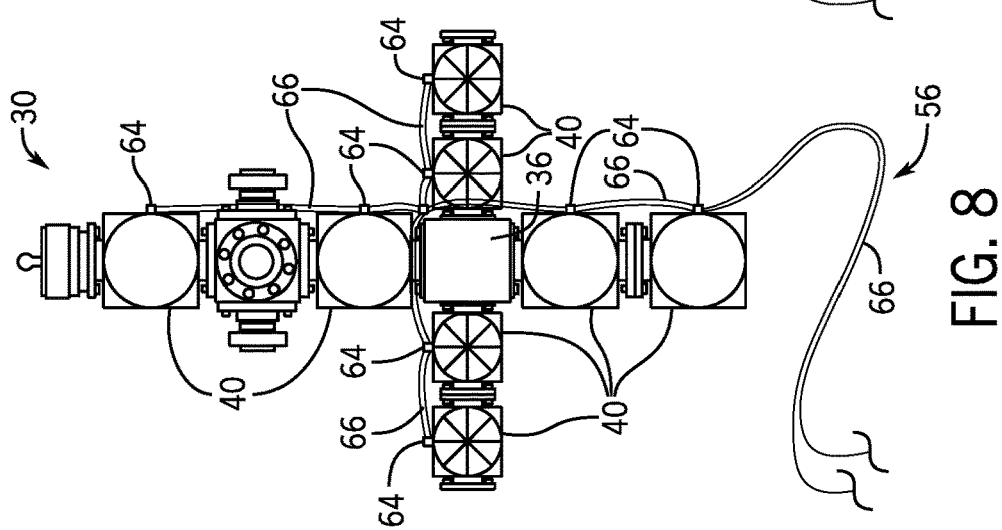
Figure 11:
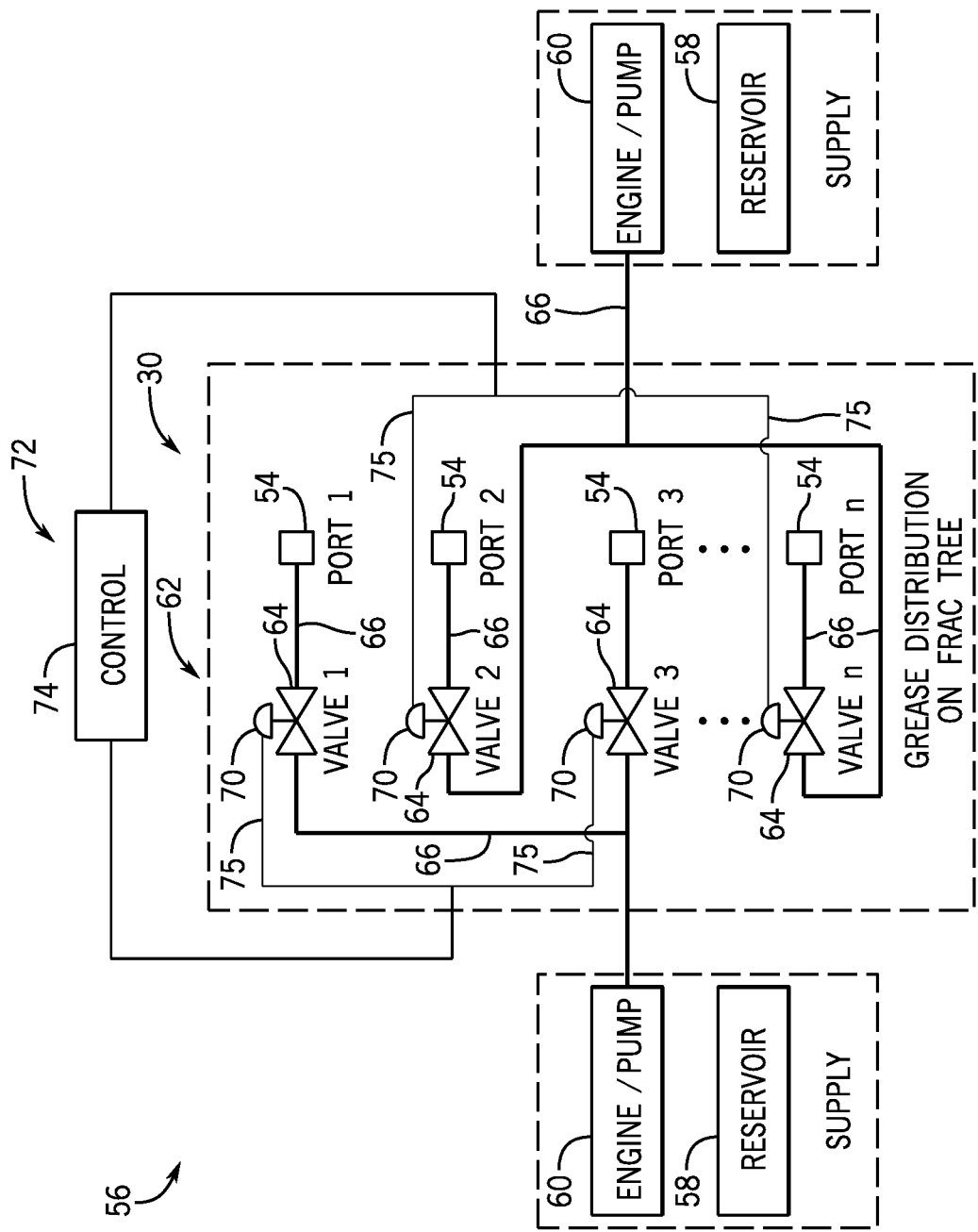
FIG. 11 is a schematic illustration of an example of instrumentation on a frac tree for dual greasing implementation in a greasing system, according to an embodiment of the disclosure.

As illustrated in FIG. 7, some embodiments combine the grease distribution network 62 into or onto the well tree 30 to further reduce the distance over which the grease travels during a greasing operation. Instead of using a separate, dedicated grease manifold 68, the grease manifold (or other grease distribution network) may be integrated directly into or onto the well tree 30. In this embodiment and other embodiments, the pump 60 may be an individual pump or a plurality of pumps.

In some embodiments, a dual greasing configuration may be utilized as illustrated in FIGS. 8-11. In this type of application, a plurality, e.g. two, grease flow lines 66 supply grease to the grease distribution network 62. Additionally, the greasing system 56 utilizes a plurality of grease reservoirs 58, e.g. dual reservoirs, and a plurality of grease pumps 60, e.g. dual pumps. The greasing control system 72 may again be used to control the flow of grease to specific actuatable valves 40. However, the separate reservoirs 58/pumps 60 enable grease to be pumped into different ports 54 at the same time.

As will be appreciated from FIGS. 4-6 and 8-10, rather than having a separate, dedicated grease line 66 for each grease valve 64, multiple grease valves 64 can be connected to receive grease from a shared grease line 66. In some embodiments, a series of grease valves 64 are daisy-chained to receive grease from a single, shared grease line 66. In at least one embodiment, each grease valve 64 of a tree 30 is connected in a single daisy chain to receive grease from a single grease line 66. In another embodiment, a tree 30 may include multiple daisy chains of grease valves 64 for distributing grease via shared grease lines 66. In some instances, such as shown in FIGS. 5 and 6, a pair of grease valves 64 for an actuatable valve 40 can be connected (e.g., via a jumper or branch lines) along a shared grease line 66 that serves as a grease bus to other such pairs of grease valves 64 for other actuatable valves 40.

Figure 12:
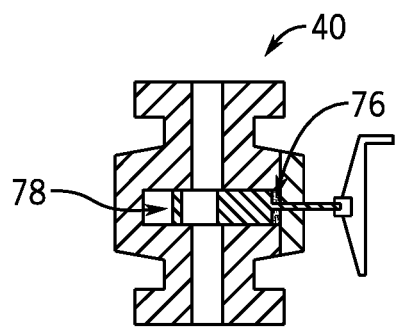
FIG. 12 is a cross-sectional schematic illustration of an actuatable valve actuated to a first position, according to an embodiment of the disclosure.
Figure 13:
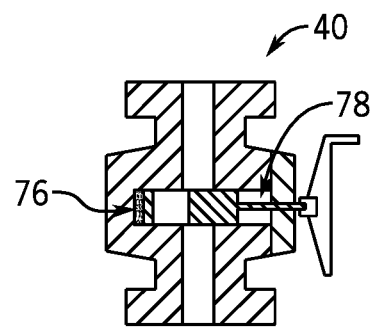
FIG. 13 is a cross-sectional schematic illustration of an actuatable valve actuated to a second position, according to an embodiment of the disclosure.
Figure 14:
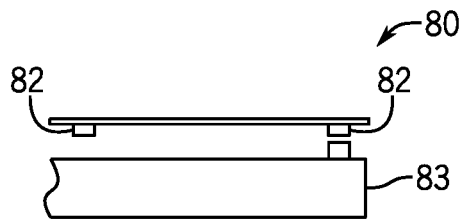
FIGS. 14 and 15 are schematic illustrations of a sensor system used to detect actuation positions of an actuatable valve, according to an embodiment of the disclosure.
Figure 15:
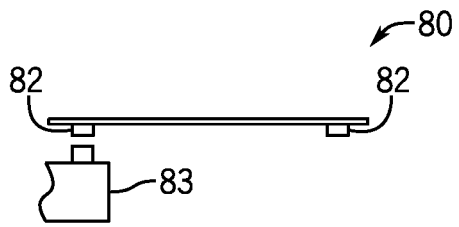
Figure 16:
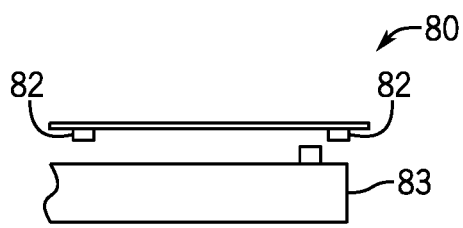
FIGS. 16 and 17 are schematic illustrations of a sensor system used to detect actuation positions of an actuatable valve, including positions of misalignment caused by debris, e.g. sand, in the actuatable valve, according to an embodiment of the disclosure.
Figure 17:
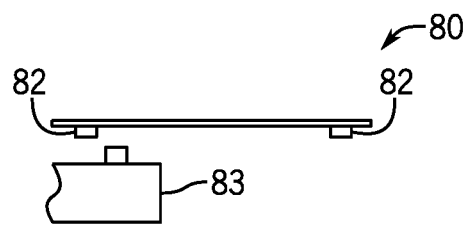

Referring generally to FIGS. 12 and 13, the effect of debris, e.g. sand, accumulated inside an actuatable valve 40 is illustrated. In FIG. 12, the actuatable valve 40 is illustrated in an open flow position and in FIG. 13 the actuatable valve 40 has been shifted to a closed flow position. However, full opening and full closure is blocked by debris 76, e.g. sand, inside an internal cavity 78 of the valve 40. If the debris 76 remains, excessive erosion of the valve gate or improper flow path isolation can occur. To remove the debris 76, the corresponding grease valve 64 may be opened so that greasing system 56 is able to pump grease through the internal cavity 78 for removal of the debris 76. In some embodiments, two grease ports 54 on each valve 40 are used with separate grease valves 64 which may be individually opened to remove debris 76 from each side of cavity 78.

According to some embodiments, a sensing system 80 may be used to detect the lack of full valve opening or closure, e.g. to detect a deviation/misalignment in valve position from the desired valve position. When such misalignment is detected, greasing control system 72 may output a warning that a greasing operation should be implemented. According to some applications, the sensing system 80 may work in cooperation with greasing control system 72 to automate the greasing and debris removal.

By way of example, the sensing system 80 may comprise a plurality of sensors 82, e.g. proximity sensors, positioned to detect valve movement, e.g. movement of a valve stem 83, as illustrated in FIGS. 14-17. When the debris 76 prevents the valve stem 83 from reaching its proper open or closed position (see FIGS. 16 and 17), the misalignment can be detected via the sensors 82. The greasing operation for that particular actuatable valve 40 may then be implemented to remove the debris 76. After the greasing operation is performed, proper alignment is again detected via the sensors 82 (see FIGS. 14 and 15) and this may be communicated to the processor-based controller 74.

It should be noted that a variety of sensors 82 and sensor systems 80 may be implemented to detect when performance of a greasing operation on a specific actuatable valve 40 is desired. In some applications, the sensor system 80 and processor-based controller 74 may be used in concert to detect when greasing is desired and to automatically perform the greasing operation to remove debris 76 from that individual valve 40.

The system and methodology described herein also enable enforcement of valve greasing when it is truly needed. For example, the well tree 30 may utilize actuatable valves 40 which are hydraulically actuated. In this type of embodiment, the hydraulically actuated valves 40 are opened and closed to control desired flow paths during a given well operation, e.g. well stimulation operation. A hydraulic power unit may be part of a control system used to control the hydraulically actuated valves 40. To enforce greasing of a specific valve or valves 40, an interlock may be added to the hydraulic valve control system so as to force pausing of hydraulic valve operation until the greasing is completed.

Figure 18:
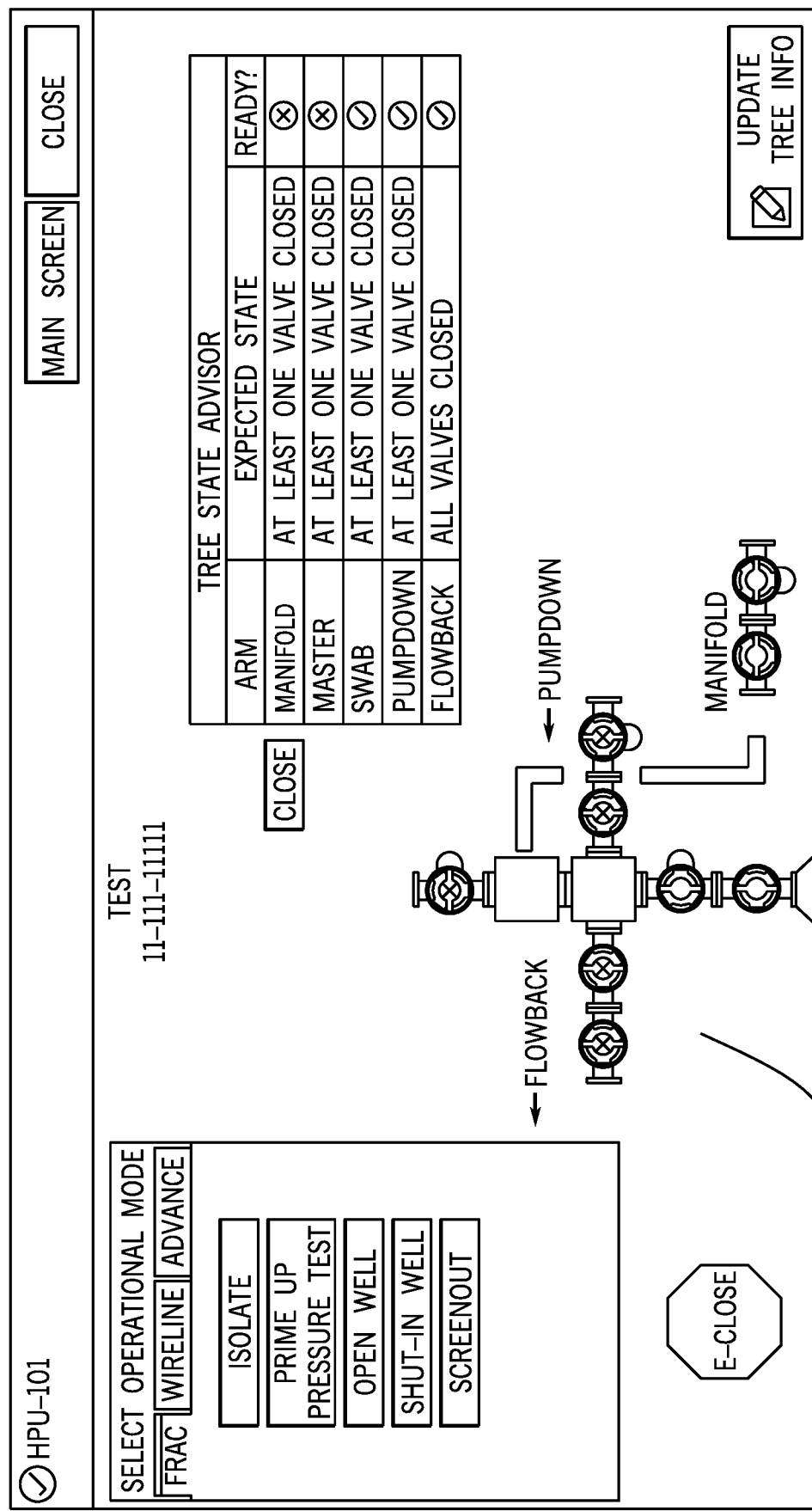
FIG. 18 is an illustration of an example of a control system output display which provides information on actuatable valves of a well tree, according to an embodiment of the disclosure.
Figure 19:
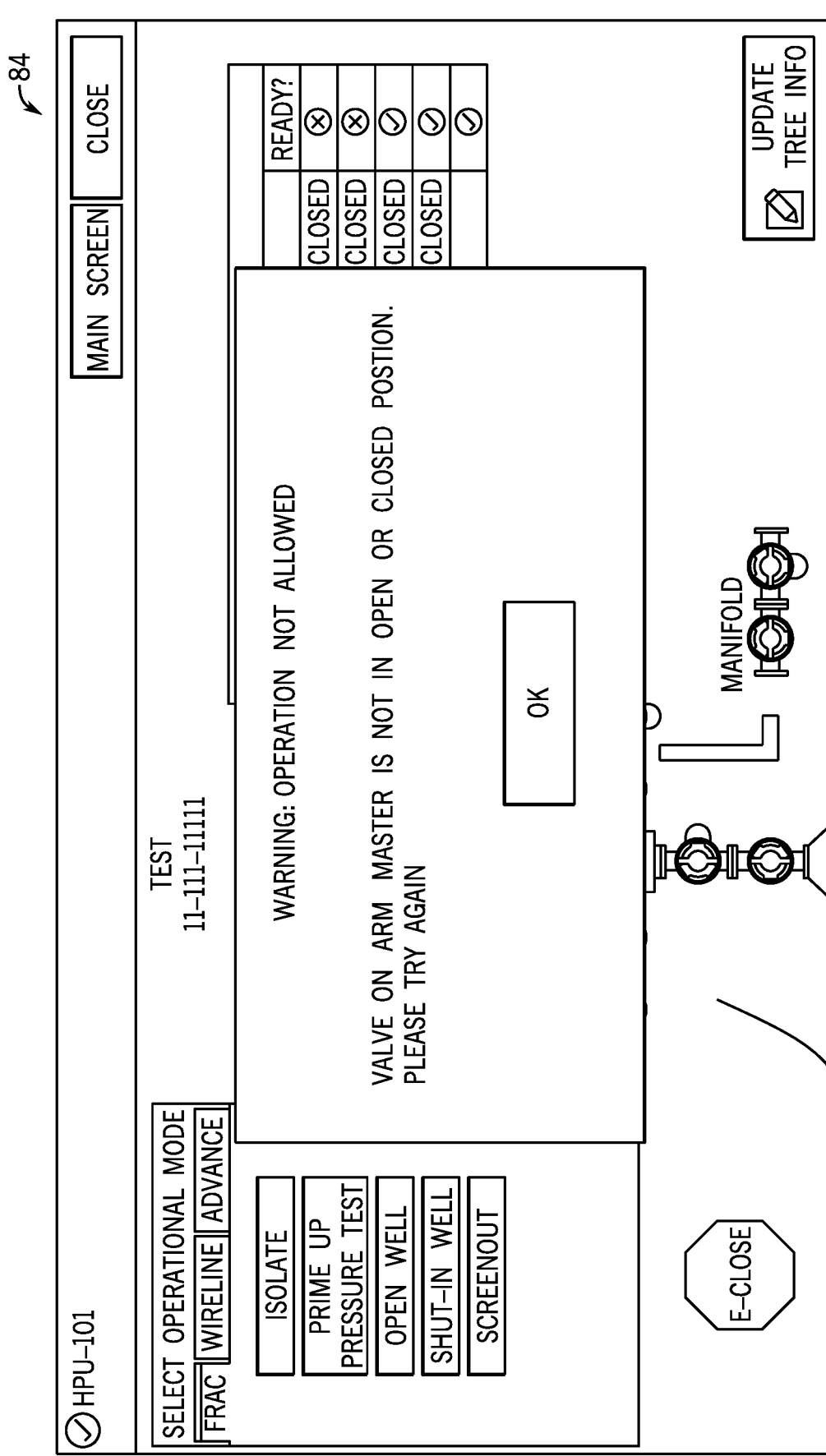
FIG. 19 is an illustration of an example of a control system output display which provides information, including warnings, regarding actuatable valves of a well tree, according to an embodiment of the disclosure.

As illustrated in FIGS. 18 and 19, a valve control system 84, e.g. a hydraulic valve control system, may comprise a processor-based system having a display 85 which utilizes output screens to provide information related to valve operation. However, the display 85 also may be used to output an indication, e.g. a warning, when valve operation is locked to enable and ensure greasing of a desired valve or valves 40 (see FIG. 19). By way of example, real-time valve status may be provided by proximity switches and collected in the software of valve control system 84. When sensor misalignment occurs (see FIGS. 16 and 17), the software interface can pause the normal operation of valves 40 and display a suitable warning message. At this stage, greasing of the selected actuatable valve(s) 40 is performed and sensor alignment is reestablished so that valve operation may resume.

It should be noted that sensor misalignment may be one factor in the decision-making regarding valve greasing. However, other monitoring approaches may be implemented and appropriate software may be used to determine when the interlock is applied. For example, the composition and volume of stimulation fluid flow through certain valves 40 may be monitored and used as an indicator of potential debris accumulation inside the valve 40. Various other types of information also may be gathered to determine which actuatable valves 40 should be greased. This information can then be used to determine appropriate times for greasing specific actuatable valves 40. In some instances, the controller 74 may detect during well operations (or at some other inopportune time) that greasing of a valve 40 is desired. Rather than stopping operation to enforce greasing of the valve 40, the controller 74 may output a notification to a user and delay greasing to an appropriate time, e.g. the end of the well operation. The controller 74 may prompt a user to initiate greasing at that later appropriate time, may apply an interlock to enforce greasing at that time, or automatically initiate greasing at that time.

Figure 20:
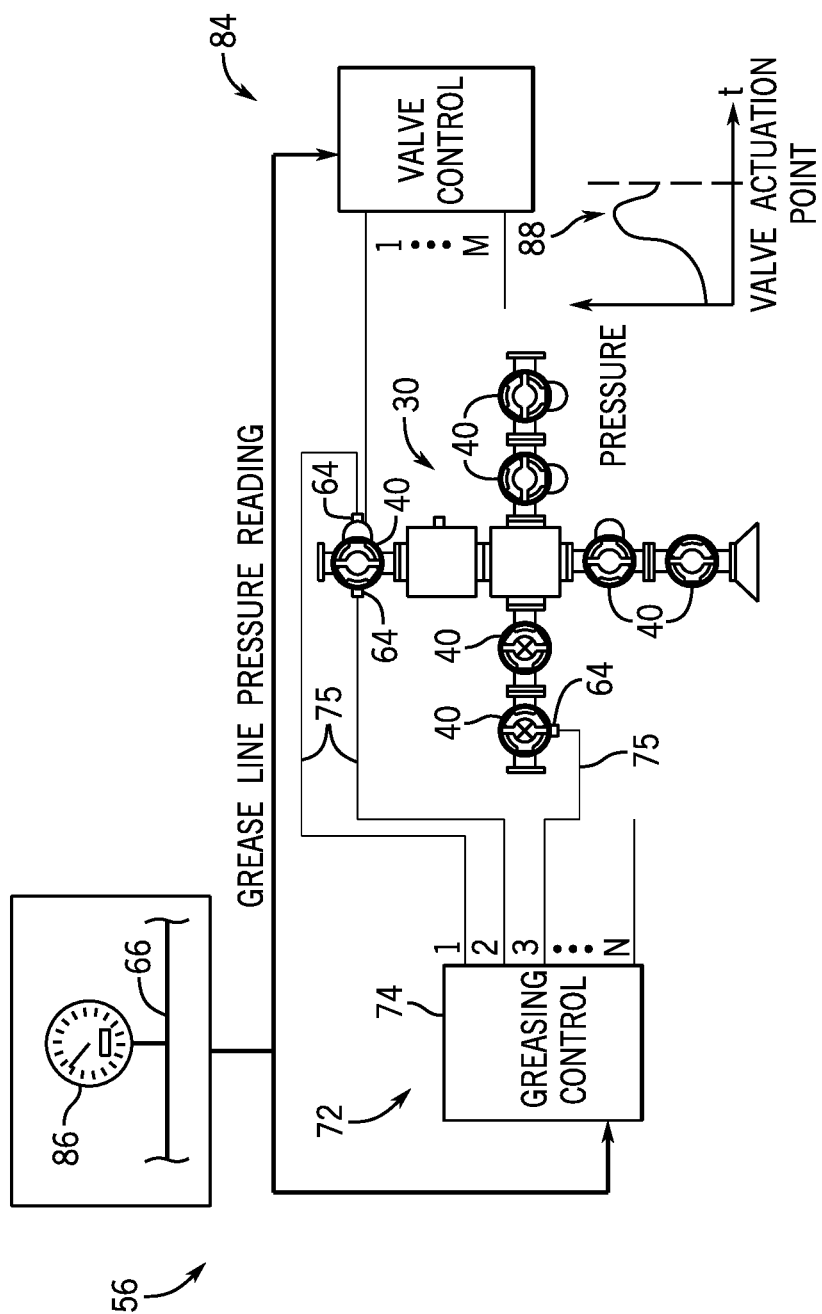
FIG. 20 is a schematic illustration of another example of a greasing system coupled with a well tree and utilizing both an actuatable valve control system and a greasing control system, according to an embodiment of the disclosure.

Referring generally to FIG. 20, an embodiment is illustrated which utilizes both greasing control system 72 and valve control system 84. This allows control over the greasing operation to be integrated with control over the operation of actuatable valves 40 on well tree 30. As a result, various automated procedures may be implemented. As described above, for example, the valve actuation may be temporarily stopped while a greasing operation is performed on a given valve or valves 40, or greasing operations may be scheduled or performed based on input from the valve control system 84, such as operational status of valve 40.

Pressure gauges 86 (or other types of sensors) may be used to monitor pressure in the various grease flow lines 66 via one or both of the greasing control system 72 and valve control system 84. In some embodiments, software may be used to map a specific grease line 66 to the grease port 54 on a corresponding actuatable valve 40. The pressure information and/or other gathered information enables monitoring of the greasing operation in real time so that normal valve operation may be restored as soon as possible. Pressure monitoring, for example, enables monitoring of the full greasing cycle as grease is pumped through the valve's internal cavity 78 on one or both sides of the valve 40. During greasing of an actuatable valve 40, pressure within the internal cavity 78 of the valve 40 can be inferred, e.g. by an operator or the control system 72 or 84, from pressure in a grease line 66 supplying the grease to the valve 40. In one embodiment, each grease port 54 has a dedicated grease line 66 whose pressure is monitored, e.g. by a pressure gauge 86. In another embodiment, at least some grease valves 64 are installed at grease ports 54 and daisy-chained or otherwise connected to receive grease via a shared grease line 66 whose pressure is monitored, e.g. by a pressure gauge 86. Pressure gauges 86 may be installed at any suitable locations in the system. In some instances, pressure gauges 86 may be used to directly monitor pressure within internal cavities 78 of valves 40.

Figure 21:
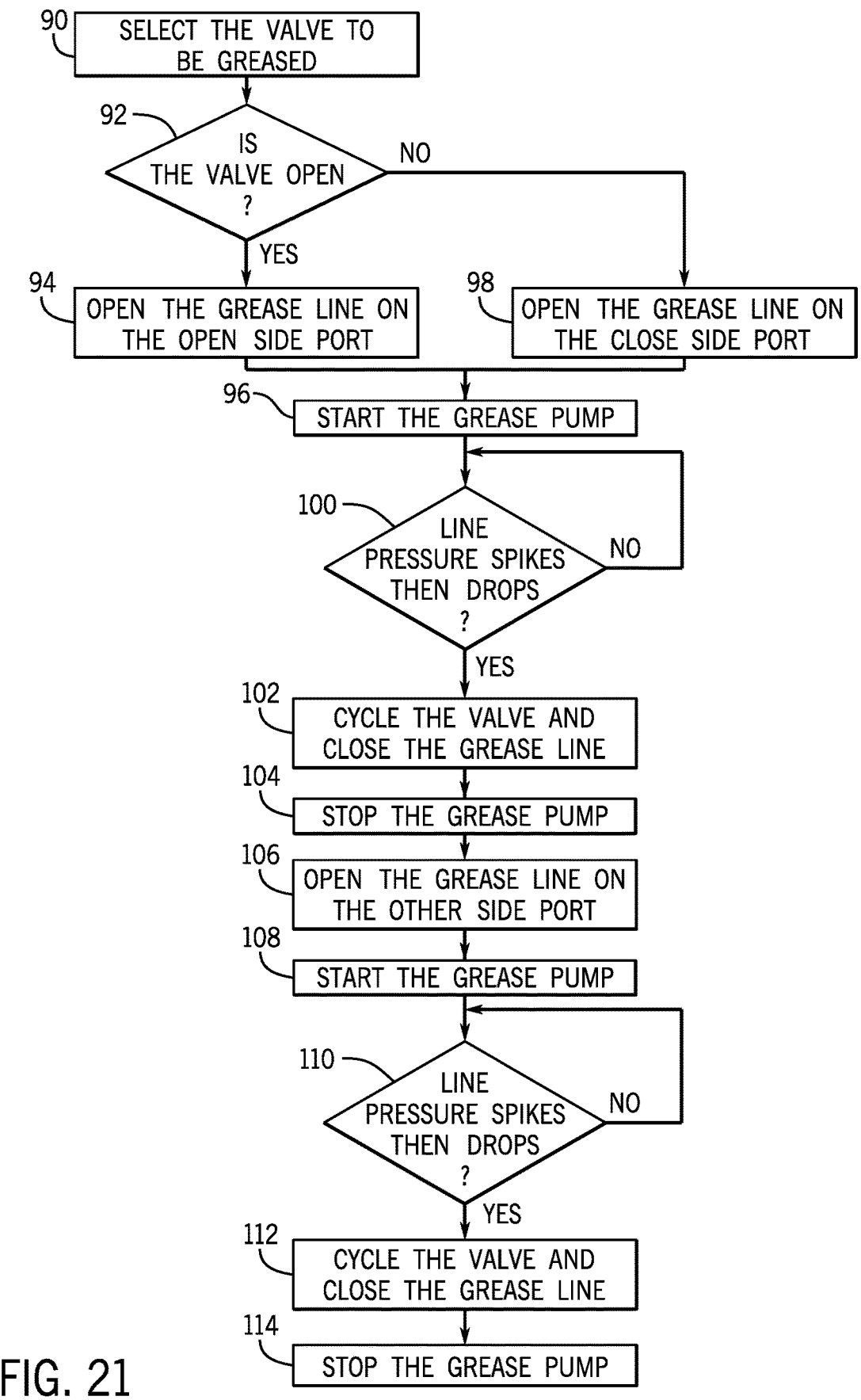
FIG. 21 is a flow chart illustrating an example of a greasing procedure, according to an embodiment of the disclosure.

Referring generally to FIG. 21, a flow chart is provided to illustrate one example of a greasing operation. In this example, the appropriate actuatable valve 40 is initially selected for greasing, as represented by block 90. Then, sensor system 80 in cooperation with greasing control system 72 and/or valve control system 84 determines whether the actuatable valve 40 is in an open or closed position, as represented by block 92. If the actuatable valve 40 is in an open flow position, the appropriate grease valve 64 is actuated to enable grease flow through the corresponding grease port 54 to direct grease into the appropriate side of the valve internal cavity 78 as indicated by block 94. The grease pump 60 is then started to pump grease under pressure through the grease network 62, as represented by block 96. However, if the actuatable valve 40 is in a closed position, a different grease valve 64 is actuated to enable grease flow through the appropriate grease port 54 on an opposite side of the valve internal cavity 78 as indicated by block 98. The grease pump 60 would then be started to pump grease under pressure through the grease network 62 as once again represented by block 96.

Regardless of which side or sides of the actuatable valve 40 receives grease, the grease line pressure is monitored, e.g. via a pressure gauge 86 of the grease line 66 supplying the grease into the internal cavity 78, to determine a pressure drop indicative of completion of the greasing operation, as indicated by block 100. An example of a pressure monitored via a pressure gauge 86 during greasing is generally depicted as a function of time in FIG. 20. When grease is initially pumped into the valve internal cavity 78, the pumped grease may be filling a void left by grease lost during prior operation. As the cavity 78 fills with grease, pressure will build up in the cavity. At some point the new grease will start to displace the old grease and the debris 76 to the other side of the cavity 78 and the pressure will start to fall again. This pressure spike as pressure builds up and then drops is generally depicted by the upward and downward slopes of peak 88 in FIG. 20. Once the appropriate pressure drop is determined via, for example, greasing control system 72, the actuatable valve 40 may be cycled (i.e., alternated between open and closed positions) to displace debris-entrained grease and the corresponding grease valve 64 may then be closed to block further flow of grease through the corresponding grease port 54, as indicated by block 102. The grease pump 60 may then be stopped, as indicated by block 104.

Assuming the actuatable valve 40 has two grease ports 54, the appropriate grease valve 64 may then be actuated to open flow of grease to the valve internal cavity 78 on the other side of the valve gate, as indicated by block 106. The grease pump 60 would then be started to pump grease under pressure through the grease network 62 as represented by block 108. The pressure of the grease is again monitored until the appropriate pressure drop is determined, as indicated by block 110. After this pressure drop, the actuatable valve 40 may be cycled to displace debris-entrained grease and the corresponding grease valve 64 is then closed to block further flow of grease through the corresponding grease port 54, as indicated by block 112. At this stage, both sides of the selected actuatable valve 40 have been greased and the grease pump 60 may be stopped, as indicated by block 114. In at least some instances, the cycling of valve 40 and closing of grease valve 64 of blocks 102 and 112 are automatically performed (e.g., by either or both of the greasing control system 72 or valve control system 84) without user intervention in response to identification of the pressure response (i.e., spike then drop) of blocks 100 and 110. Further, other portions of the greasing operation represented in FIG. 21 may be automated in some instances, and in at least one embodiment the entirety of the greasing operation of FIG. 21 may be automated.

Depending on the parameters of a given stimulation operation and on the configuration of a given well tree 30, the actuatable valves 40, valve control system 84, and greasing system 56 may have various configurations. For example, the actuatable valves 40 may be hydraulically actuatable, electrically actuatable, or otherwise actuatable in response to signals provided from the valve control system 84. Additionally, the greasing system 56 may utilize various types of pumps, reservoirs, greasing valves, and control systems.

For example, greasing control system 72 may comprise various types of computers or other processing systems 74 programmed to automate greasing based on data acquired from various types of sensors systems and/or desired greasing schedules. Similarly, the greasing control system 72 may work in cooperation with valve control system 84. In some embodiments, the valve control system 84 and greasing control system 72 may be part of the same processing system. For example, a computer-based processing system 74 may be used to control both actuation of actuatable valves 40 and operation of the greasing system 56. In other applications, however, the greasing control system 72 and the valve control system 84 may be separate systems controlled by individual processor-based controls 74.

Figure 22:
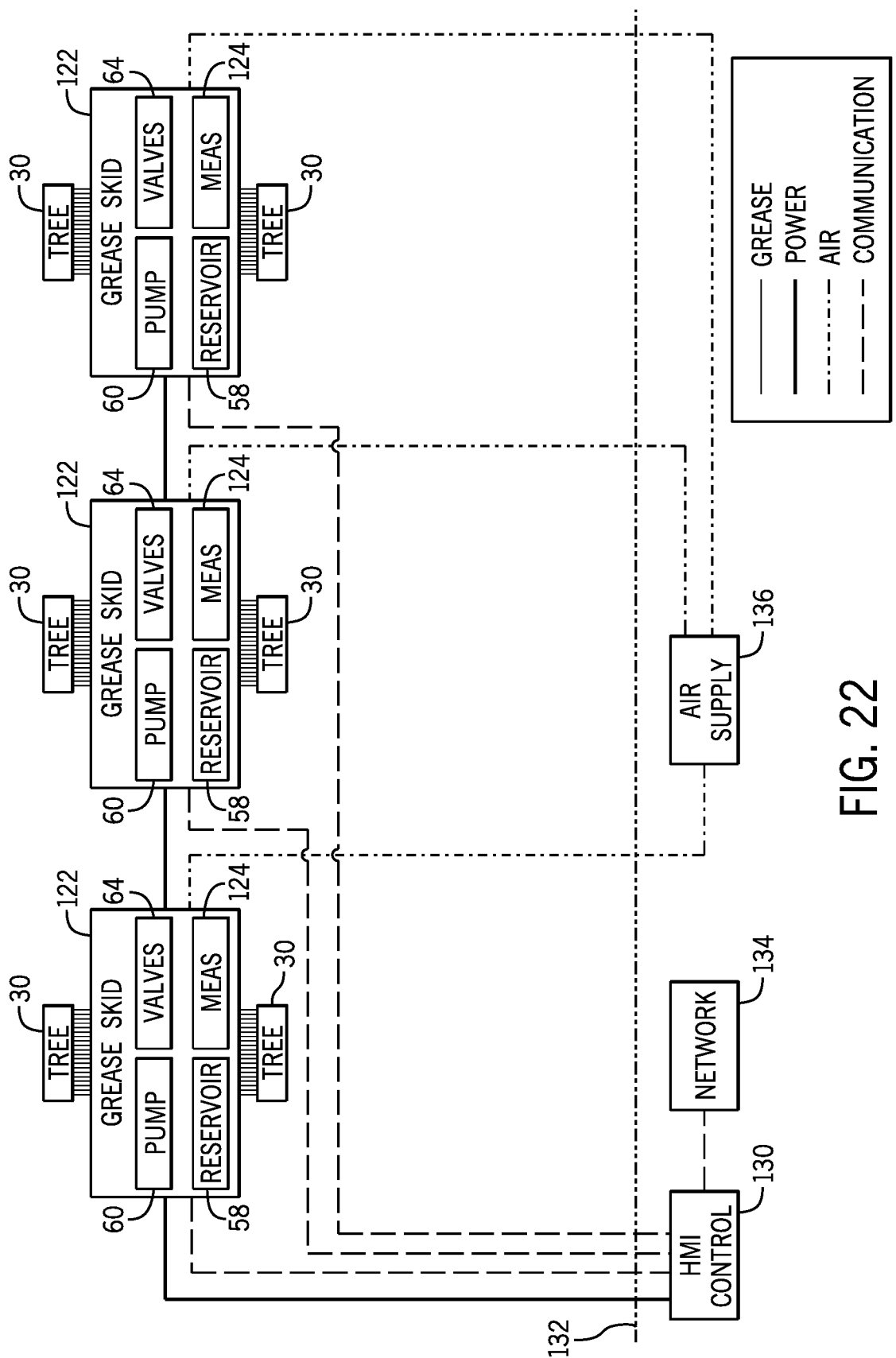
FIG. 22 is a schematic representation of a wellsite having a greasing system with grease valves and pumps installed near fracturing trees within a high-pressure zone of the wellsite and a controller positioned in a safe zone, according to an embodiment of the disclosure.

Referring generally to FIG. 22, an embodiment is illustrated in which some greasing equipment is located within a high-pressure zone near trees 30, while other equipment is located in a safe zone remote from the trees 30. More specifically, FIG. 22 depicts grease skids 122 for greasing valves, e.g. actuatable valves 40 or 52, of the trees 30 or an associated manifold. The depicted grease skids 122 include a grease pump 60 fed by a grease reservoir 58. In some instances, a grease skid 122 may include multiple grease pumps 60 or reservoirs 58.

The grease skids 122 are also shown in FIG. 22 as having grease valves 64 for controlling flow of grease to the actuatable valves for the trees 30. Any number of suitable grease lines may be used to connect the grease skids 122 to the actuatable valves for the trees 30. As an example, twenty grease lines connect each tree 30 (which may also include an associated manifold section 50, such as described above) to a grease skid 122 in FIG. 22. This arrangement would allow flow of grease to up to twenty grease ports 54 of the actuatable valves for each tree 30 via individual grease lines 66. In other instances, however, the grease valves 64 may be installed on the tree 30 and one or more shared grease lines 66 may route grease from a grease skid 122 to the tree 30. In some embodiments, each tree 30 is coupled to a grease skid 122 by a single grease line 66. As noted above, the grease valves 64 may be daisy-chained via a shared grease line 66 or connected to a shared grease line 66 serving as a grease bus. The grease skids 122 may also include measurement devices 124 (e.g., sensors) for monitoring a greasing operation. These measurement devices 124 may include one or more of stroke counters for the grease pumps 60, level sensors for the grease reservoirs 58, or pressure gauges 86, to name but a few examples.

A human-machine interface (HMI) control 130 is connected to the grease skids 122 to control greasing operations. Skilled artisans will appreciate that an area surrounding a tree 30 may be considered a high-pressure zone or otherwise hazardous area. Well operations within the high-pressure zone may be stopped in some instances to enable a technician to enter the high-pressure zone and perform certain tasks. In the embodiment depicted in FIG. 22, however, the HMI control 130 is positioned in a safe zone outside of the high-pressure zone surrounding the trees 30 to enable user-control of the greasing operation from the safe zone. The demarcation between the high-pressure zone and the safe zone is generally represented by dashed line 132 in FIG. 22. In one embodiment, the HMI control 130 is an HMI control skid with a programmable logic controller (PLC), e.g. controller 74, placed in the safe zone. Power may be provided from the HMI control 130 to the grease skids 122, and communication lines facilitate communication (e.g., data signals and command signals) between the HMI control 130 and the grease skids 122. In some instances, the grease pumps 60 are pneumatic pumps driven by an air supply 136, which may include an air compressor and air manifold positioned within the safe zone.

The HMI control 130 may include a user interface with a configuration page to configure (e.g., map) and validate grease supply connections between grease ports 54 of the trees 30 and outlets of the grease skid 122. The user interface of the HMI control 130 may show (e.g., via a display 85) a screen depicting statuses of valves or greasing operations. When a grease pump 60 begins to stroke, the number of strokes may be counted and displayed on the HMI user interface along with the amount of grease delivered for each greasing instance. The amount of grease may be calculated from the number of strokes, from a grease meter, from a grease reservoir level sensor, from weighing a grease reservoir 58 supplying the grease (with the weight falling in proportion to the amount of grease drawn), or in any other suitable manner. Total grease used for a job may similarly be determined and displayed to a user. Outlet pressures of the grease pumps 56 and inlet and outlet pressures of the grease valves 64 may also be measured (e.g., via pressure sensors 86) and displayed to a user to facilitate user decision-making on greasing or valve control. Measurements and other data provided to the HMI control 130 may be stored locally or transmitted to remote systems via network 134.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well application, comprising:
    a well tree having a flow cross and a plurality of valve sections coupled to the flow cross, the plurality of valve sections comprising actuatable valves, each actuatable valve having a grease port through which grease may be received to flush debris from the actuatable valve;
    a greasing system having a grease reservoir, a grease pump which is fed by grease from the grease reservoir, and a grease distribution network connected between the grease pump and the grease ports, the grease distribution network comprising a plurality of grease valves actuatable to control flow of grease to selected grease ports;
    a control system connected to the grease valves to selectively open and close the grease valves; and
    a sensor system to sense valve position of each actuatable valve, the sensor system coupled to the control system to provide an indication to the control system when valve actuation is affected by debris in a given actuatable valve.

2. The system as recited in claim 1, wherein the grease valves are disposed in a grease distribution manifold.

3. The system as recited in claim 1, wherein the grease valves comprise a dedicated grease valve in fluid communication with each grease port.

4. The system as recited in claim 1, wherein each actuatable valve has at least a pair of grease ports.

5. The system as recited in claim 1, wherein the greasing system comprises dual grease reservoirs and dual grease pumps.

6. The system as recited in claim 1, wherein the control system is configured to automatically initiate flushing of the given actuatable valve with grease to clear the debris.

7. The system as recited in claim 1, wherein the actuatable valves are hydraulically actuatable valves.

8. A system, comprising:
    a frac tree having a plurality of actuatable valves;
    a greasing system coupled to the plurality of actuatable valves to supply grease under pressure for cleaning debris from selected actuatable valves of the plurality of actuatable valves;
    a valve control system to control actuation of individual actuatable valves between closed and open positions;
    a sensor system to sense valve position of each actuatable valve, the sensor system coupled to the valve control system to provide an indication to the control system when valve actuation is affected by debris in a given actuatable valve; and
    a greasing control system to automatically control greasing of individual actuatable valves.

9. The system as recited in claim 8, wherein the plurality of actuatable valves is positioned along valve sections coupled with a flow cross of the frac tree.

10. The system as recited in claim 8, wherein the plurality of actuatable valves comprises grease ports with each actuatable valve having at least one grease port.

11. The system as recited in claim 10, wherein the greasing system comprises a plurality of grease valves positioned to selectively control flow of grease to the grease ports.

12. The system as recited in claim 11, wherein the greasing control system is coupled with the plurality of grease valves to enable control of selected individual grease valves.

13. The system as recited in claim 12, wherein the grease valves are positioned in a manifold.

14. The system as recited in claim 12, wherein the plurality of grease valves is located at the frac tree and just one grease line is connected between the frac tree and a grease supply.

15. The system as recited in claim 12, wherein multiple grease valves of the plurality of grease valves are daisy-chained together.

16. The system as recited in claim 8, wherein the valve control system and the greasing control system are part of the same computer control system.

17. The system as recited in claim 8, wherein the valve control system and the greasing control system are each part of a separate computer control system.

18. A method, comprising:
pumping grease to a well tree to remove debris from actuatable valves positioned in the well tree;
providing grease valves along flows of grease to individual actuatable valves;
sensing actuation of the actuatable valves to determine which actuatable valves would benefit from greasing and debris removal; and
using a greasing control system to selectively open grease valves to accommodate desired debris removal from selected actuatable valves.

19. The method as recited in claim 18, further comprising using the greasing control system to automatically direct grease to specific actuatable valves based on feedback from a sensor system.

* * * * *